(12) United States Patent
Gaborel et al.

(10) Patent No.: US 7,758,459 B2
(45) Date of Patent: Jul. 20, 2010

(54) TENSIONING ROLLER DEVICE

(75) Inventors: Jean-Philippe Gaborel, Tours (FR);
Donatus Nwokoye, Carrieres-sous-Poissy (FR); Romuald Lescorail, Tours (FR); Laurent Varnoux, Tours (FR)

(73) Assignee: Aktiebolaget SKF, Göteborg (SE)

( * ) Notice: Subject to any disclaimer, the term of this patent is extended or adjusted under 35 U.S.C. 154(b) by 59 days.

(21) Appl. No.: 11/866,291

(22) Filed: Oct. 2, 2007

(65) Prior Publication Data
US 2008/0167150 A1    Jul. 10, 2008

(30) Foreign Application Priority Data
Oct. 3, 2006 (FR) ................. 06 54056

(51) Int. Cl.
*F16H 7/10* (2006.01)
*F16H 7/18* (2006.01)
*F16H 55/36* (2006.01)

(52) U.S. Cl. .................. 474/112; 474/54; 474/178; 474/100

(58) Field of Classification Search ........... 474/112, 474/160, 166, 174, 177, 178, 179, 180, 191, 474/54, 100; 242/615.2
See application file for complete search history.

(56) References Cited

U.S. PATENT DOCUMENTS

| | | | |
|---|---|---|---|
| 704,203 A * | 7/1902 | Moorhouse | 474/83 |
| 1,368,068 A | 2/1921 | Stein et al. | |
| 2,055,524 A | 9/1936 | Milford | |
| 2,140,975 A | 12/1938 | Welch | |
| 3,008,362 A | 11/1961 | Tucker | |
| 3,258,962 A | 7/1966 | Dahle | |
| 3,365,967 A | 1/1968 | Friedrich | |

(Continued)

FOREIGN PATENT DOCUMENTS

DE    570710    2/1933

(Continued)

OTHER PUBLICATIONS

Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.

(Continued)

*Primary Examiner*—John Q Nguyen
*Assistant Examiner*—Henry Liu
(74) *Attorney, Agent, or Firm*—Metertons, Hood, Kivlin, Kowert & Goetzel, P.C.; Eric B. Meyertons

(57) ABSTRACT

Tensioning roller device including a non-rotating part about which there is rotationally mounted a pulley-forming rotating assembly designed to collaborate with a belt or a chain and a rolling bearing positioned between the non-rotating part and the pulley and including a rotating ring, a non-rotating ring and rolling elements, the pulley including a rigid rim including a first part fixed to the rotating ring of the bearing and a second part that can move with respect to the first part under the action of an elastic element, and an expandable sleeve of annular overall shape designed to be in contact with the belt or the chain, the diameter of the expandable sleeve varying according to how hard it is pressed by the second part.

8 Claims, 2 Drawing Sheets

U.S. PATENT DOCUMENTS

| | | | |
|---|---|---|---|
| 3,881,370 A * | 5/1975 | Vogelaar et al. | 474/18 |
| 3,965,565 A | 6/1976 | Fujii | |
| 3,981,205 A * | 9/1976 | Avramidis et al. | 474/13 |
| 4,018,318 A | 4/1977 | Hallerberg | |
| 4,020,720 A | 5/1977 | Fujii | |
| 4,029,186 A | 6/1977 | De Gennes | |
| 4,046,238 A | 9/1977 | Mendoza-Orozco | |
| 4,119,625 A | 10/1978 | Schmidlin | |
| 4,175,453 A | 11/1979 | Exner et al. | |
| 4,281,539 A | 8/1981 | Keller | |
| 4,319,220 A | 3/1982 | Pappas et al. | |
| 4,435,890 A | 3/1984 | Ernst et al. | |
| 4,438,901 A | 3/1984 | Reneau et al. | |
| 4,478,595 A | 10/1984 | Hayakawa et al. | |
| 4,494,637 A | 1/1985 | Gotoda et al. | |
| 4,497,523 A | 2/1985 | Lederman | |
| 4,505,484 A | 3/1985 | Ohkuma et al. | |
| 4,523,742 A | 6/1985 | Reneau | |
| 4,528,895 A | 7/1985 | Nakamura | |
| 4,541,744 A | 9/1985 | Lederman | |
| 4,589,861 A * | 5/1986 | Dodge | 474/178 |
| 4,601,374 A | 7/1986 | Ladin | |
| 4,602,875 A | 7/1986 | Doerr et al. | |
| 4,608,741 A | 9/1986 | Mallet | |
| 4,641,523 A | 2/1987 | Andreasson | |
| 4,699,530 A | 10/1987 | Satoh et al. | |
| 4,708,036 A | 11/1987 | Vossbrinck | |
| 4,722,617 A | 2/1988 | Stella et al. | |
| 4,732,494 A | 3/1988 | Guers et al. | |
| 4,735,598 A * | 4/1988 | Moroto et al. | 474/29 |
| 4,738,651 A * | 4/1988 | Favache et al. | 474/19 |
| 4,781,656 A * | 11/1988 | Brackett et al. | 474/29 |
| 4,815,867 A | 3/1989 | Ladin | |
| 4,854,436 A | 8/1989 | Lassiaz et al. | |
| 4,857,033 A * | 8/1989 | Czarka | 474/14 |
| 4,867,292 A | 9/1989 | Hartig | |
| 4,872,768 A | 10/1989 | Brandenstein et al. | |
| 4,874,073 A | 10/1989 | Tagawa | |
| 4,878,411 A * | 11/1989 | Laskowski et al. | 83/820 |
| 4,881,629 A | 11/1989 | Gay et al. | |
| 4,915,512 A | 4/1990 | Hilby et al. | |
| 4,929,217 A * | 5/1990 | Merbler | 474/54 |
| 4,939,936 A | 7/1990 | Spooner et al. | |
| 4,946,295 A | 8/1990 | Hajzler | |
| 4,957,133 A | 9/1990 | Linz et al. | |
| 4,970,945 A | 11/1990 | Schmidt | |
| 4,998,453 A | 3/1991 | Walton | |
| 5,008,647 A | 4/1991 | Brunt et al. | |
| 5,017,741 A | 5/1991 | Brown et al. | |
| 5,018,384 A | 5/1991 | Hayashi et al. | |
| 5,033,013 A | 7/1991 | Kato et al. | |
| 5,049,113 A * | 9/1991 | Graham, Jr. | 474/49 |
| 5,051,693 A | 9/1991 | Brauer | |
| 5,072,181 A | 12/1991 | Burger | |
| 5,198,738 A | 3/1993 | Blaser et al. | |
| 5,264,790 A | 11/1993 | Moretti et al. | |
| 5,372,435 A | 12/1994 | Genero et al. | |
| 5,377,580 A | 1/1995 | Merklein et al. | |
| 5,454,585 A | 10/1995 | Dronen et al. | |
| 5,523,681 A | 6/1996 | Hajzler et al. | |
| 5,570,871 A | 11/1996 | Westerfeld | |
| 5,575,568 A | 11/1996 | Rigaux et al. | |
| 5,592,401 A | 1/1997 | Kramer | |
| 5,598,913 A | 2/1997 | Monahan et al. | |
| 5,620,209 A | 4/1997 | Sauer | |
| 5,657,544 A | 8/1997 | Ota et al. | |
| 5,709,624 A * | 1/1998 | Donowski | 474/8 |
| 5,713,577 A | 2/1998 | Lannert et al. | |
| 5,721,539 A | 2/1998 | Goetzl | |
| 5,780,731 A | 7/1998 | Matsui et al. | |
| 5,845,230 A | 12/1998 | Lamberson | |
| 5,865,288 A | 2/1999 | Thomire et al. | |
| 5,877,431 A | 3/1999 | Hirano | |
| 6,011,491 A | 1/2000 | Goetzl | |
| 6,013,007 A | 1/2000 | Root et al. | |
| 6,017,285 A * | 1/2000 | Yasuhara et al. | 474/12 |
| 6,025,737 A | 2/2000 | Patel et al. | |
| 6,035,990 A | 3/2000 | Peschke | |
| 6,043,643 A | 3/2000 | Message et al. | |
| 6,056,446 A | 5/2000 | Welter et al. | |
| 6,109,624 A | 8/2000 | Message et al. | |
| 6,129,643 A | 10/2000 | Tamagawa et al. | |
| 6,152,844 A * | 11/2000 | Daugherty | 474/49 |
| 6,155,543 A | 12/2000 | Solomond et al. | |
| 6,160,480 A | 12/2000 | Su-yueh | |
| 6,196,552 B1 | 3/2001 | Peterson et al. | |
| 6,241,257 B1 | 6/2001 | Hauck et al. | |
| 6,248,035 B1 * | 6/2001 | Bartlett | 474/13 |
| 6,267,512 B1 | 7/2001 | Beghini et al. | |
| 6,288,533 B1 | 9/2001 | Haeberli et al. | |
| 6,304,079 B1 | 10/2001 | Kenjo et al. | |
| 6,310,450 B1 | 10/2001 | Arrigo | |
| 6,323,640 B1 | 11/2001 | Forestiero et al. | |
| 6,328,148 B2 | 12/2001 | Winkelmann et al. | |
| 6,338,576 B1 | 1/2002 | Girardin et al. | |
| 6,348,019 B1 * | 2/2002 | Yuan | 474/8 |
| 6,357,926 B1 | 3/2002 | Hauck et al. | |
| 6,415,900 B1 | 7/2002 | Lopez et al. | |
| 6,417,075 B1 | 7/2002 | Haberger et al. | |
| 6,421,903 B2 * | 7/2002 | Brown | 29/428 |
| 6,458,054 B1 * | 10/2002 | Mimura | 474/100 |
| 6,539,336 B1 | 3/2003 | Vock et al. | |
| 6,550,755 B2 | 4/2003 | Ehrhardt et al. | |
| 6,558,043 B2 | 5/2003 | Beghini et al. | |
| 6,564,480 B1 | 5/2003 | Tomita et al. | |
| 6,585,615 B2 * | 7/2003 | Uota | 474/242 |
| 6,593,733 B1 | 7/2003 | Nicot | |
| 6,611,138 B2 | 8/2003 | Vasiloiu | |
| 6,612,749 B2 | 9/2003 | Arnault et al. | |
| 6,656,070 B2 * | 12/2003 | Tay | 474/83 |
| 6,666,784 B1 | 12/2003 | Iwamoto et al. | |
| 6,702,085 B1 | 3/2004 | Ponson | |
| 6,712,366 B1 | 3/2004 | Cargill | |
| 6,746,352 B1 | 6/2004 | Poiret et al. | |
| 6,814,496 B2 | 11/2004 | Beghini et al. | |
| 6,837,116 B2 | 1/2005 | Desbiolles | |
| 6,889,794 B2 | 5/2005 | Higashira et al. | |
| 6,908,229 B2 | 6/2005 | Landrieve et al. | |
| 7,033,080 B2 | 4/2006 | Landrieve et al. | |
| 7,033,293 B2 | 4/2006 | Serkh | |
| 7,114,853 B2 | 10/2006 | Debrailly et al. | |
| 7,117,986 B2 | 10/2006 | Thomire et al. | |
| 7,222,709 B2 | 5/2007 | Arnault | |
| 7,228,951 B2 | 6/2007 | Arnault | |
| 7,275,462 B2 | 10/2007 | Faus et al. | |
| 7,290,351 B2 | 11/2007 | Niarfeix | |
| 7,367,714 B2 | 5/2008 | Niarfeix et al. | |
| 7,429,133 B2 | 9/2008 | Gallion et al. | |
| 2002/0026839 A1 | 3/2002 | Lehtovaara | |
| 2002/0038193 A1 | 3/2002 | Grunberg et al. | |
| 2002/0111767 A1 | 8/2002 | Lueschow et al. | |
| 2002/0112555 A1 | 8/2002 | Chikaraishi et al. | |
| 2002/0125113 A1 | 9/2002 | Bhakta et al. | |
| 2002/0126926 A1 | 9/2002 | Ohtsuki et al. | |
| 2002/0167306 A1 | 11/2002 | Zalunardo et al. | |
| 2002/0170812 A1 | 11/2002 | Calkin et al. | |
| 2002/0190709 A1 | 12/2002 | Frederick et al. | |
| 2003/0002764 A1 | 1/2003 | Pflugner et al. | |
| 2003/0007631 A1 | 1/2003 | Bolognesi et al. | |
| 2003/0137091 A1 | 7/2003 | Chesne | |
| 2004/0013334 A1 | 1/2004 | Landrieve et al. | |
| 2004/0015307 A1 | 1/2004 | Heisenberg | |
| 2004/0097313 A1 | 5/2004 | Singer | |
| 2004/0120620 A1 | 6/2004 | Landrieve | |

| | | | |
|---|---|---|---|
| 2004/0126043 A1 | 7/2004 | Ito | |
| 2004/0154895 A1 | 8/2004 | Thomire et al. | |
| 2004/0235599 A1 | 11/2004 | Ozorak et al. | |
| 2004/0254710 A1 | 12/2004 | Yano | |
| 2005/0008276 A1 | 1/2005 | Beghini et al. | |
| 2005/0026729 A1 | 2/2005 | Schenk et al. | |
| 2005/0124447 A1 | 6/2005 | Message et al. | |
| 2005/0265646 A1 | 12/2005 | Arnault | |
| 2006/0011445 A1 | 1/2006 | Bussit et al. | |
| 2006/0104558 A1 | 5/2006 | Gallion et al. | |
| 2006/0115443 A1 | 6/2006 | Gesztesi et al. | |
| 2006/0188190 A1 | 8/2006 | Schmidl et al. | |
| 2006/0227007 A1 | 10/2006 | Landrieve | |
| 2006/0243150 A1 | 11/2006 | Landrieve | |
| 2007/0025655 A1 | 2/2007 | Barraud et al. | |
| 2007/0053622 A1 | 3/2007 | Gallion et al. | |
| 2007/0074945 A1 | 4/2007 | Ponson et al. | |
| 2008/0031562 A1 | 2/2008 | Poulle | |
| 2008/0036454 A1 | 2/2008 | Landrieve | |
| 2008/0038564 A1 | 2/2008 | Bruel et al. | |
| 2008/0090686 A1 | 4/2008 | Gardelle | |
| 2008/0132365 A1 | 6/2008 | Boussaguet et al. | |
| 2008/0152272 A1 | 6/2008 | Debrailly et al. | |
| 2008/0230341 A1 | 9/2008 | Barraud et al. | |
| 2008/0248905 A1 | 10/2008 | Descombes et al. | |

FOREIGN PATENT DOCUMENTS

| | | |
|---|---|---|
| DE | 916370 | 8/1954 |
| DE | 1525294 | 2/1972 |
| DE | 7208788 | 5/1972 |
| DE | 2457863 | 6/1975 |
| DE | 2729699 | 12/1978 |
| DE | 3534462 | 4/1987 |
| DE | 3910498 | 10/1990 |
| DE | 4228899 | 3/1994 |
| DE | 4300083 | 7/1994 |
| DE | 9418459 | 2/1995 |
| DE | 29609380 | 8/1996 |
| DE | 29708535 | 8/1997 |
| DE | 19637585 | 3/1998 |
| DE | 19809074 | 1/1999 |
| DE | 19836191 | 2/2000 |
| DE | 10041095 | 6/2001 |
| DE | 10011820 | 9/2001 |
| DE | 10035488 | 1/2002 |
| DE | 10036765 | 2/2002 |
| DE | 10042677 | 3/2002 |
| DE | 10058623 | 6/2002 |
| DE | 10148388 | 4/2003 |
| DE | 102004013669 | 10/2005 |
| DE | 4300083 | 11/2008 |
| EP | 0375019 | 6/1990 |
| EP | 0395783 | 11/1990 |
| EP | 399855 | 11/1990 |
| EP | 456142 | 11/1991 |
| EP | 0511105 | 10/1992 |
| EP | 0520853 | 12/1992 |
| EP | 0806851 | 11/1997 |
| EP | 0823267 | 2/1998 |
| EP | 0890753 | 1/1999 |
| EP | 0930505 | 7/1999 |
| EP | 0992797 | 4/2000 |
| EP | 1120584 | 8/2001 |
| EP | 1146244 | 10/2001 |
| EP | 1236934 | 9/2002 |
| EP | 1445129 | 8/2004 |
| EP | 1491786 | 12/2004 |
| FR | 2574501 | 6/1986 |
| FR | 2577291 | 8/1986 |
| FR | 2602872 | 2/1988 |
| FR | 2611244 | 8/1988 |
| FR | 2630375 | 10/1989 |
| FR | 2655735 | 6/1991 |
| FR | 2667947 | 4/1992 |
| FR | 2688560 | 9/1993 |
| FR | 2703450 | 10/1994 |
| FR | 2744506 | 8/1997 |
| FR | 2751392 | 1/1998 |
| FR | 2772444 | 6/1999 |
| FR | 2799694 | 4/2001 |
| FR | 2808325 | 11/2001 |
| FR | 2819864 | 7/2002 |
| FR | 2848663 | 6/2004 |
| FR | 2856759 | 12/2004 |
| FR | 2863706 | 6/2005 |
| FR | 2867421 | 9/2005 |
| FR | 2882139 | 8/2006 |
| GB | 1580301 | 12/1980 |
| GB | 2156084 | 2/1981 |
| GB | 2156082 | 10/1985 |
| GB | 2201745 | 9/1988 |
| GB | 2259962 | 3/1993 |
| GB | 2313417 | 11/1997 |
| GB | 2347906 | 9/2000 |
| GR | 2375484 | 12/1977 |
| JP | 62278352 | 12/1987 |
| JP | 10030693 | 2/1988 |
| JP | 63172052 | 7/1988 |
| JP | 06058770 | 3/1994 |
| JP | 6213251 | 8/1994 |
| JP | 08054205 | 2/1996 |
| JP | 09292006 | 4/1996 |
| JP | 9072394 | 3/1997 |
| JP | 09229097 | 9/1997 |
| JP | 11247972 | 9/1999 |
| JP | 2000161471 | 6/2000 |
| JP | 2000209889 | 7/2000 |
| JP | 2000241197 | 9/2000 |
| JP | 2001289291 | 10/2001 |
| JP | 2004011827 | 1/2004 |
| JP | 2006183755 | 7/2006 |
| WO | 9850709 | 11/1998 |
| WO | 0000755 | 1/2000 |
| WO | 0142809 | 5/2001 |
| WO | 02052280 | 7/2002 |
| WO | 02071076 | 9/2002 |
| WO | 03067107 | 8/2003 |
| WO | 2004005937 | 1/2004 |
| WO | 2005282856 | 10/2005 |

OTHER PUBLICATIONS

"Federbeinlagerung fur Kraftfahrzeug", May 31, 1972, 6 pages (German).

International Search Report PCT/FR 02/03077, mailed Jan. 21, 2003 (4 pages).

International Preliminary Examination Report for PCT/FR02/03077, Apr. 24, 2003 (4 pages).

U.S. Patent and Trademark Office, "Communication" for U.S. Appl. No. 10/488,911, mailed Dec. 10, 2007, available in PAIR.

U.S. Patent and Trademark Office, "Communication" for U.S. Appl. No. 10/488,911, mailed Apr. 23, 2008, available in PAIR.

U.S. Patent and Trademark Office, "Communication" for U.S. Appl. No. 10/488,911, mailed Aug. 19, 2008, available in PAIR.

French Preliminary Search Report for FR 0114669, Sep. 2, 2002 (3 pages).

International Search Report for PCT/FR02/03867, mailed Apr. 4, 2003 (6 pages).

International Preliminary Examination Report for PCT/FR02/03867, Mar. 12, 2004 (17 pages).

U.S. Patent and Trademark Office, "Communication" for U.S. Appl. No. 10/495,496, mailed Jun. 23, 2008, available in PAIR.

French Preliminary Search Report for FR 0311989, Feb. 24, 2004 (2 pages).

U.S. Patent and Trademark Office, "Communication" for U.S. Appl. No. 10/965,679, mailed Jan. 15, 2008, available in PAIR.
U.S. Patent and Trademark Office, "Communication" for U.S. Appl. No. 10/965,679, mailed May 14, 2008, available in PAIR.
International Search Report for PCT/FR03/02113, mailed Nov. 27, 2003 (4 pages).
International Preliminary Examination Report for PCT/FR03/02113, Apr. 26, 2004 (8 pages).
French Preliminary Search Report for FR 0407390, Feb. 4, 2005 (1 page).
U.S. Patent and Trademark Office, "Communication" for U.S. Appl. No. 11/175,013, mailed Apr. 2, 2007, available in PAIR.
U.S. Patent and Trademark Office, "Communication" for U.S. Appl. No. 11/175,013, mailed Aug. 16, 2007, available in PAIR.
U.S. Patent and Trademark Office, "Communication" for U.S. Appl. No. 11/175,013, mailed Dec. 17, 2007, available in PAIR.
U.S. Patent and Trademark Office, "Communication" for U.S. Appl. No. 11/175,013, mailed May 28, 2008, available in PAIR.
U.S. Patent and Trademark Office, "Communication" for U.S. Appl. No. 11/175,013, mailed Sep. 18, 2008, available in PAIR.
International Search Report for PCT/FR041000639, mailed Oct. 12, 2004 (2 pages).
International Preliminary Report on Patentability for PCT/FR04/000639, Feb. 28, 2005 (11 pages).
Written Opinion of the International Search Authority for PCT/FR2004/000639, Oct. 26, 2004 (5 pages).
U.S. Patent and Trademark Office, "Communication" for U.S. Appl. No. 10/548,866, mailed Oct. 9, 2007, available in PAIR.
International Search Report for PCT/FR2004/001557, mailed Jan. 5, 2005 (6 pages).
Written Opinion of the International Search Authority for PCT/FR2004/001557, Jan. 3, 2005 (11 pages).
International Preliminary Report on Patentability for PCT/FR2004/001557, Jan. 3, 2006 (13 pages).
International Search Report for PCT/FR04/001609, mailed Dec. 3, 2004 (6 pages).
French Preliminary Search Report for FR 0309239, Apr. 16, 2004 (2 pages).
Written Opinion of the International Search Authority for PCT/FR2004/001609, Dec. 2, 2004 (11 pages).
International Preliminary Report on Patentability for PCT/FR2004/001609, Jan. 30, 2006 (13 pages).
French Preliminary Search Report for FR 0502005, Oct. 3, 2005 (3 pages).
U.S. Patent and Trademark Office, "Communication" for U.S. Appl. No. 11/361,306, mailed Aug. 19, 2008, available in PAIR.
International Search Report for PCT/FR2004/002542, mailed Jun. 28, 2005 (6 pages).
Written Opinion of the International Search Authority for PCT/2004/002542, Jun. 24, 2005 (6 pages).
International Preliminary Report on Patentability for PCT/FR2004/002542, Oct. 25, 2005 (11 pages).
U.S. Patent and Trademark Office, "Communication" for U.S. Appl. No. 11/536,105, mailed Apr. 20, 2007, available in PAIR.

U.S. Patent and Trademark Office, "Communication" for U.S. Appl. No. 11/536,105, mailed Oct. 3, 2007, available in PAIR.
U.S. Patent and Trademark Office, "Communication" for U.S. Appl. No. 11/536,105, mailed Aug. 1, 2008, available in PAIR.
French Preliminary Search Report for FR 0507997, Apr. 13, 2006 (2 pages).
U.S. Patent and Trademark Office, "Communication" for U.S. Appl. No. 11/484,321, mailed Sep. 17, 2008, available in PAIR.
French Preliminary Search Report for FR 0605698, Jan. 23, 2007 (2 pages).
International Search Report for PCT/FR2006/000349, mailed Jun. 26, 2006 (4 pages).
Written Opinion of the International Search Authority for PCT/FR2006/000349, Sep. 3, 2007 (10 pages).
International Preliminary Report on Patentability for PCT/FR2006/000349, Aug. 21, 2007 (6 pages).
French Preliminary Search Report for FR 0654056, Mar. 29, 2007 (2 pages).
French Preliminary Search Report for FR 0654082, May 9, 2007 (2 pages).
International Search Report for PCT/FR2006/000908, mailed Jul. 20, 2007 (6 pages).
International Preliminary Report on Patentability for PCT/FR2006/000908, Oct. 23, 2007 (16 pages).
Written Opinion of the International Search Authority for PCT/FR2006/000908, Oct. 22, 2007 (14 pages).
French Preliminary Search Report for FR 0654418, Mar. 28, 2007 (2 pages).
French Preliminary Search Report for FR 0655556, Aug. 1, 2007 (2 pages).
French Preliminary Search Report for FR 0753542, Nov. 7, 2007 (2 pages).
French Preliminary Search Report for FR 0754038, Dec. 21, 2007 (2 pages).
French Preliminary Search Report for FR0754582, Feb. 1, 2008 (2 pages).
International Search Report for PCT/FR2006/002769, mailed Apr. 25, 2007 (4 pages).
International Preliminary Report on Patentability for PCT/FR2006/002769, Jun. 24, 2008 (12 pages).
Written Opinion of the International Search Authority for PCT/FR2006/002769, Jun. 20, 2008 (10 pages).
French Preliminary Search Report for FR 0756272, Feb. 14, 2008 (2 pages).
International Search Report for PCT/FR2007/000001, mailed Oct. 16, 2007 (4 pages).
International Preliminary Report on Patentability for PCT/FR2007/000001, Jul. 8, 2008 (6 pages).
Written Opinion of the International Search Authority for PCT/FR2007/000001, Jul. 6, 2008 (5 pages).
French Preliminary Search Report for FR 0312354, Apr. 21, 2004 (1 page).
French Preliminary Search Report for FR651486, Feb. 4, 2005 (1 page).

* cited by examiner

TENSIONING ROLLER DEVICE

BACKGROUND OF THE INVENTION

1. Field of the Invention

The present invention generally relates to the field of belt or chain tensioning roller devices, particularly automatic tensioning rollers, used in particular to ensure appropriate belt or chain tension, for example in timing belts or belts used to drive auxiliaries or the like. Automatic tensioning rollers such as these can be used in motor vehicle combustion engines and allow the belt tension to be kept always within a predetermined range.

2. Description of the Relevant Art

Tensioning rollers generally include a support intended to be fixed to an engine block, and a moving part that can move angularly with respect to the support. The moving part is provided with an eccentric and with a rolling bearing on which there is mounted a roller intended to be in contact with the belt. A spring constantly exerts a tensioning force between the support and the moving part, causing the roller to be in contact with the belt under appropriate tension. The moving part is mounted on the support with the possibility of adjustment so that the belt tension can be adapted. Thus, there are automatic tensioning rollers that include an adjustment eccentric used to preposition the roller against the belt, the eccentric then being immobilized with respect to the engine block using a screw, and a working eccentric mounted directly or indirectly about the adjusting eccentric and used to convert the torsional moment of a spring into a radial force on the belt. In operation, the working eccentric can oscillate angularly with respect to the adjustment eccentric or with respect to an intermediate part, thanks to bearing bushes that form a plain bearing. Reference may be made to document EP B 456 142.

Document FR 2 624 577 discloses a tensioning roller including a swinging arm pivotably mounted on a pivot pin fixed to the engine block. The arm is angularly actuated by a return spring in a direction that tends to press the roller against a belt. While such devices are satisfactory from the performance standpoint, their very high number of component parts is a disadvantage, and they are generally expensive to manufacture.

Document U.S. Pat. No. 6,129,643 describes a variable-diameter pulley including a part in contact with the belt that can off-center itself with respect to a part secured to the shaft. However, this type of pulley is heavy, wears quickly, carries a risk of vibration and noise, and is expensive, as much because of the number of component parts as because of their complexity, which parts need to be fitted together particularly accurately. The part in contact with the belt is in the form of a rigid annulus.

Document U.S. Pat. No. 7,033,293 describes an expanding pulley including a plurality of blocks separated from one another and in contact with the belt. The blocks can move radially between two sides of the pulley under the action of a conical element moved by a spring. Once again, the number of component parts is very high. Manufacturing and assembling the blocks are expensive. There is a risk that the conical component will become skewed, causing the pulley to become unbalanced and generating vibrations. Furthermore, the discontinuous contact between the blocks and the belt also causes vibrations and variations in the belt tension, which are likely to result in premature wear.

SUMMARY OF THE INVENTION

The described embodiments are aimed at an automatic tensioning roller device, of simple and economical design, including a low number of component parts and avoiding the generation of vibration or premature wear.

The tensioning roller device includes a non-rotating part about which there is rotationally mounted a pulley-forming rotating assembly designed to collaborate with a belt or a chain and a rolling bearing positioned between the non-rotating part and the pulley and including a rotating ring, a non-rotating ring and rolling elements. The pulley includes a rigid rim including a first part fixed to the rotating ring of the rolling bearing and a second part that can move with respect to the first part under the action of an elastic element, and an expandable sleeve of annular overall shape designed to be in contact with the belt, the diameter of the expandable sleeve varying according to how hard it is pressed by the second part. The first part can be obtained economically by casting or machining a light alloy, alternatively by machining a steel blank. The second part can be formed by pressing a sheet, and this proves particularly economical. The expanding sleeve can be obtained by molding a flexible material, for example a natural and/or synthetic elastomer, possibly containing a filler, for example a filler in fiber or powder form that allows its mechanical properties to be adjusted.

In one embodiment, the expanding sleeve can be expanded radially. Thus, the outside diameter of the surface of the pulley in contact with the belt or chain is variable.

As a preference, the surfaces of the first and second parts of the rim in contact with the expandable sleeve are annular. This then encourages the expandable sleeve to maintain its annular shape at various stages of expansion of its exterior surface.

In one embodiment, the sleeve has frustoconical lateral faces to match the first and second parts of the rim.

In one embodiment, the sleeve is symmetric with respect to a radial plane.

In one embodiment, the sleeve has an axial bore to match the shape of the first part.

In another embodiment, the sleeve has substantially radial lateral faces to match the shape of the first and second parts.

In one embodiment, the sleeve has a frustoconical interior face to match the shape of the first part.

In one embodiment, the second part is in the form of a cup mounted with the ability to move in axial translation on the first part. The elastic element may exert an axial thrust on the second part.

In one embodiment, the elastic element includes a spring positioned between the second part and a bearing surface secured to the first part. The bearing surface may be formed by a plate fixed, for example by bonding or by welding, to one axial end of the first part. The plate may be fixed to the first part after the sleeve, the second part, and the axially elastic element have been fitted.

Advantageously, the expandable sleeve is in one piece. The expandable sleeve may be made of a material that is elastically deformable and substantially maintains its volume.

In one embodiment, the second part includes a frustoconical portion in contact with the expandable sleeve and an axial portion in contact with the first part. The second part may include a radial portion between the frustoconical portion and the axial portion.

In one embodiment, the second part includes a radial portion in contact with the expandable sleeve and an axial portion in contact with the first part.

In one embodiment, the spring is a helical spring.

In one embodiment, the rolling bearing includes two rows of rolling elements.

In one embodiment, the non-rotating ring of the rolling bearing is mounted on an adjustment eccentric.

In one embodiment, the first part includes a stepped exterior surface with a small-diameter portion in contact with the second part and a large-diameter portion in contact with the expandable sleeve, a shoulder separating the small-diameter portion from the large-diameter portion.

In one embodiment, the first part includes a flange directed outwards from the axial end of the large-diameter portion.

Alternatively, the exterior surface of the first part includes a small-diameter portion in contact with the second part, and a frustoconical portion in contact with the expandable sleeve.

Alternatively, the exterior surface of the first part includes an axial portion in contact with the second part and with the expandable sleeve.

This then yields an automatic tensioning roller device of a reasonable mass, which is compact, is made up of component parts, the shapes of which are relatively simple and economical, both to manufacture and to assemble. Because the sleeve in contact with the belt is of annular shape, the amount of vibration generated is extremely small.

BRIEF DESCRIPTION OF THE DRAWINGS

The present invention will be better understood from reading the detailed description of a number of embodiments taken by way of entirely non-limiting examples and illustrated by the attached drawings in which.

Figure 1:
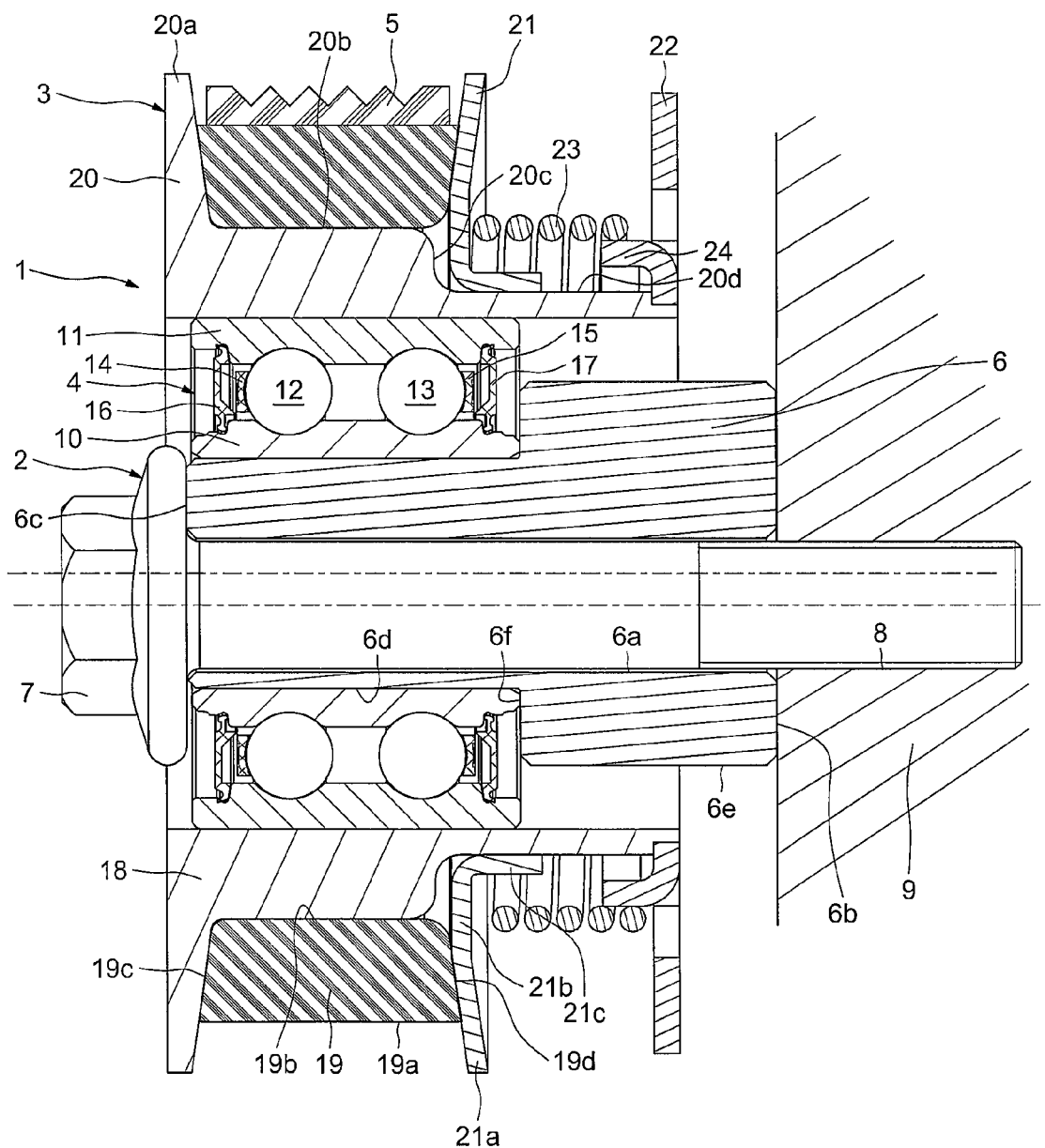
FIG. 1 is a view in axial section of a tensioning roller according to a first embodiment.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

As can be seen in FIG. 1, the tensioning roller device, referenced 1 in its entirety, includes a stationary part 2 and a rotating part 3 mounted to rotate with respect to the fixed part 2 by means of a rolling bearing 4. The rotating part 3 is designed to be in contact with a belt or the chain 5 in order to tension the belt or chain 5.

The fixed part 2 includes an adjustment eccentric 6 and a screw 7 positioned in a bore 6a of the adjustment eccentric 6. One end of the screw is engaged in a threaded hole 8 formed in a support 9, for example an engine block. The adjustment eccentric 6 is in contact via one radial face with the support 9 and via an opposite radial face with the head of the screw 7. The adjustment eccentric 6 has an exterior surface of revolution which is stepped with a large-diameter portion on the same side as the support 9 and a small-diameter portion on the same side as the head of the screw 7, the rolling bearing 4 being pushed onto the small-diameter portion. The small-diameter and large-diameter portions are separated by a radial shoulder. The small-diameter portion 6d of the exterior surface of the adjustment eccentric 6 has its geometric axis parallel to the geometric axis of the bore 6a. The small-diameter portion 6d is therefore off-centered with respect to the screw 7.

The rolling bearing 4 includes an inner ring 10, an outer ring 11, two rows of rolling elements 12 and 13 positioned in parallel planes and held in place by cages 14 and 15 respectively, and two seals 16 and 17. The inner ring 10 has a bore pushed onto the small-diameter portion 6d, and two transverse surfaces, one of which is in contact with the shoulder 6f of the adjustment eccentric 6. The inner ring 10 is provided with an exterior surface in which raceways are formed for the rolling elements 12 and 13 and grooves are formed to contact the lips of the sealing members 16 and 17. The cages 14 and 15 maintain the uniform circumferential spacing of the rolling elements 12 and 13. The outer rings 10 and 11 are respectively of one piece. The outer ring 11 is equipped with an interior surface in which raceways are formed for the rolling elements 12 and 13 and grooves are formed into which the sealing members 16 and 17 are pushed. The sealing members 16 and 17 provide a static seal against the rotating outer ring 11 and a dynamic seal against the non-rotating inner ring 10. The outer ring 11 has a cylindrical axial exterior surface.

The rotating part 3 of the automatic tensioning roller includes a rim 18 and an expandable sleeve 19, of annular overall shape and positioned in an annular housing that is open to the outside and formed in the rim 18. The expandable sleeve 19 has an annular exterior surface 19a designed to come into contact with the belt 5. The expanding sleeve 19 also has a cylindrical bore 19b and two slightly frustoconical lateral surfaces 19c and 19d.

The rim 18 includes a main part 20 provided with a bore in which the outer ring 11 of the rolling bearing 4 is pushed. The main part 20 includes a flange 20a of radial overall shape directed outwards on the same side as the head of the screw 7, a stepped exterior surface with a large-diameter surface 20b, a shoulder 20c and a small-diameter surface 20d at the same end as the support 9. The face of the flange 20a that is adjacent to the large-diameter surface 20b is slightly frustoconical to match the shape of the lateral surface 19c of the expanding sleeve. The large-diameter surface 20b is axial and in contact with the bore 19b of the expandable sleeve 19.

The rim 18 includes an axially mobile piece 21 in the form of a sheet metal cup, for example formed by pressing. The moving part 21 includes a frustoconical part 21a of matching shape and in contact with the lateral face 19d of the expandable sleeve 19, a radial portion 21b extending the frustoconical portion 21a inwards and an axial upstand 21c extending from the axial portion 21b away from the shoulder 20c of the main part 20. The moving part 21 is mounted around the main part 20, the axial upstand 21c surrounding and being in contact with a part of the small-diameter surface 20d. The moving part 21 is mounted with the freedom to move in terms of translation about the main part 20.

The rim 18 includes a plate 22 fixed to the free end of the main part 20 on the opposite side to the flange 20a. Attachment may be by bonding, push-fitting and/or welding. The plate 22 may be in the form of a sheet metal roundel while the main part 20 may be produced by machining and/or casting a light alloy or alternatively steel component.

The rim 18 also includes an actuator 23 positioned between the moving part 21 and the plate 22, which is fixed with respect to the main part 20. The actuator 22 here includes an axially-acting spring 23, for example in the form of a helical spring made of round-section wire. The actuator 23 exerts an axial force on the plate 22 and on the moving part 21, tending to push the moving part 21 towards the flange 20a of the main part 20, and therefore tending to reduce the space available for the expandable sleeve 19 by reducing the axial distance between the lateral walls of the expandable sleeve 19. The actuator 23 is centered by centering lugs 24 formed in the plate 22 by cutting and bending. The actuator 23 is thus kept in an appropriate radial position.

The rim 18 may be fitted by placing the expandable sleeve 19 around the large-diameter surface 20b then by fitting the moving part 21 followed by the spring 23 and finally the plate 22 permanently fixed to the main part 20. Since the moving part 21 has a tendency to move towards the flange 20a of the main part 20, the expandable sleeve 19 has a tendency to deform, with a reduction in its axial dimension and an increase in its radial dimension. Since the inside diameter of the expanding sleeve is determined by the large-diameter surface of the main part 20 which is rigid, the increase in the radial dimension of the expandable sleeve 19 is achieved by increasing the diameter of the exterior surface, hence applying additional tension to the belt.

The rim 18, the rolling bearing 4 and the adjustment eccentric 6 may be assembled by push-fitting. Before the screw 7 is fully tightened in the support 9, the adjustment eccentric 6 can be rotated in such a way that the expandable sleeve 19 comes into contact with the belt, exerting a predetermined force. The eccentric 6 can be adjusted while measuring torque, the torque exerted on the eccentric 6 being maintained until the screw 7 is tightened, thus determining the radial force exerted by the pulley on the belt and therefore the initial tension in the belt 5 in case the belt should become slack, for example through ageing, heating, etc.

The outside diameter of the expandable sleeve 19 may then increase slightly under the effect of the thrust exerted by the actuator 23 via the moving part 21, hence reapplying tension to the belt 5 and compensating for the loss in belt tension. Conversely, if the belt 5 should become excessively tensioned, for example in particularly cold weather, the expandable sleeve 19 will have a tendency to become radially squashed and push the moving part 21 axially, thus countering the effect of the force of the actuator 23.

Figure 2:
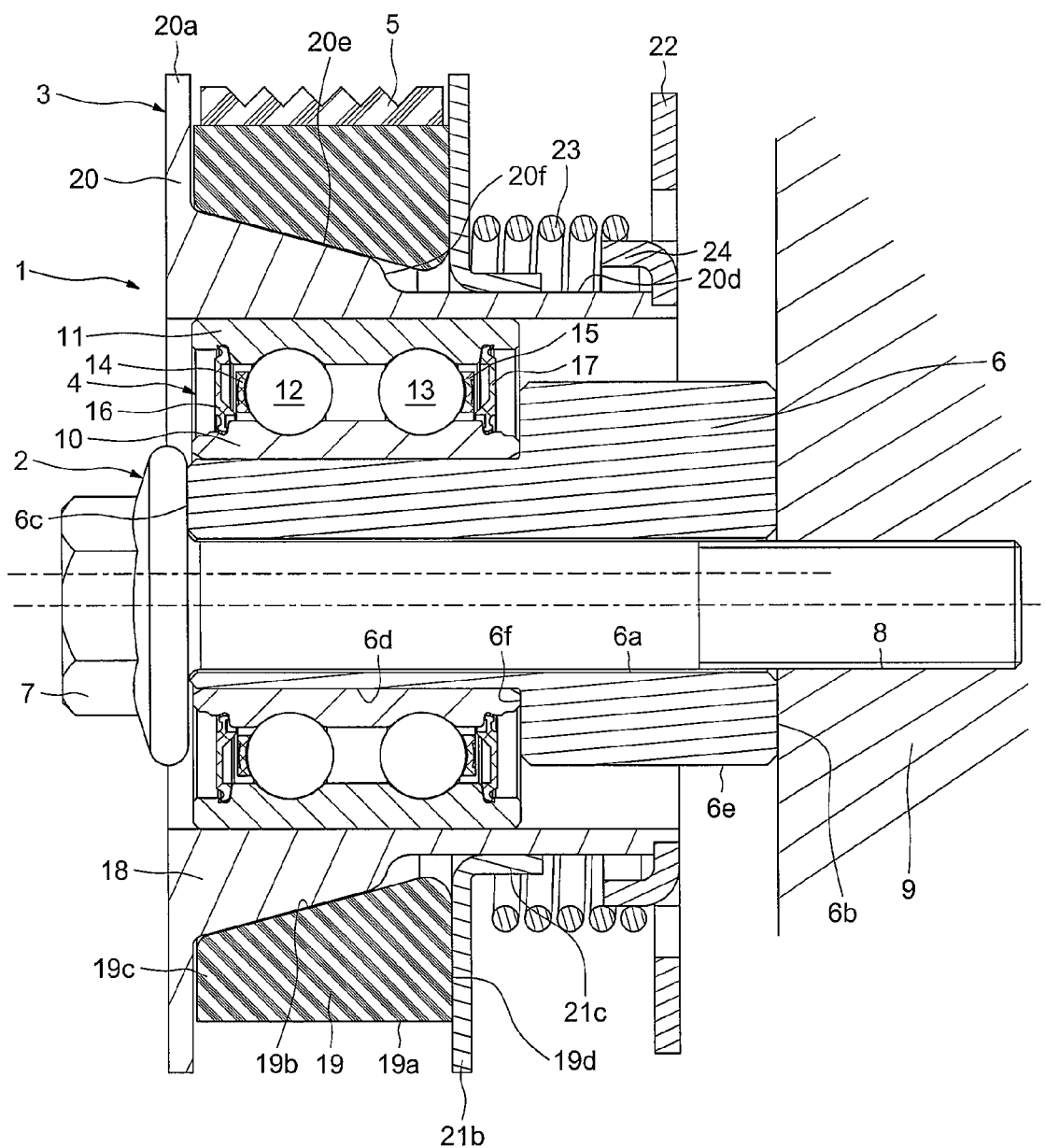
FIG. 2 is a view in axial section of a tensioning roller according to another embodiment.

The embodiment illustrated in FIG. 2 is similar to the one illustrated in FIG. 1 except that the moving part 21 has a simplified shape with an axial portion 21b extending from the axial upstand 21c as far as the free end of the said moving part 21 and in contact with the expandable sleeve 19. The expandable sleeve 19 has lateral faces 19c and 19d that is substantially radial and parallel to one another. The interior surface 19b of the expandable sleeve 19 is frustoconical, to match the shape of the main part 20 of the rim 18. The main part 20 has a flange 20a with two radial faces, one of them an outer face and the other on the same side of the expanding sleeve 19, a small-diameter surface 20d on the same side as the support 9 and a frustoconical surface 20e extending between the flange 20a and the small-diameter surface 20d. The frustoconical surface 20e has a large diameter on the same side as the flange 20a and a small diameter on the opposite side. The connection between the frustoconical surface 20e and the small-diameter surface 20d is via a short step of a gradient steeper that the gradient of the frustoconical surface 20e.

The assembly and operation of the automatic tensioning roller is similar to what was described with reference to FIG. 1. The mass of the rim 18 is slightly less because of the reduction in the volume of material in the main part 20.

It is also possible to anticipate a main part 20 equipped with a continuous small-diameter axial surface 20d connected at one end to the foot of the flange 20a and fixed at the other end to the plate 22, thus increasing the radial thickness of the expandable sleeve 19, allowing an additional weight saving and simplifying the shape of the main part 20.

Thus, the eccentric allows preadjustment to be performed by rotating the eccentric about the screw and bringing the pulley and belt into contact. The choice of actuator 23, particularly of the spring, particularly its elasticity and stiffness, and the choice of deformable material for the expandable sleeve, allow the radial deformation of the expandable sleeve 19 to be chosen to suit. In both of the embodiments illustrated hereinabove, the presence of the frustoconical surface in contact with the expandable sleeve allows the axial movement of the moving part to be converted into an expansion of the outside diameter of the expandable sleeve, and allows this to be done in an extremely simple and economical way.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A tensioning roller device comprising:
a non rotating central journal part,
a pulley forming assembly, designed to support a belt or a chain on an external cylindrical grip surface of the assembly, the assembly being rotatably mounted around the journal part by means of a bearing, said bearing comprising a non rotating ring assembled to the non rotating part, a rotating ring belonging to the pulley assembly, and rolling elements between the two rings;
wherein the pulley forming assembly comprises:
a first sheath part assembled to the rotating ring, defining a first circumferential flange, and defining a guiding axial surface;
a second sheath part assembled around the guiding axial surface of the first sheath part, so as to slide axially along this guiding axial surface, the second sheath part defining a second circumferential flange;
a frustoconical or cylindrical base surface coaxial to the guiding axial surface, with a minimum diameter larger than the diameter of the guiding axial surface, the base surface pertaining either to the first or to the second sheath part and being placed between the two flanges;
a sheath inner sleeve of annular shape, assembled around the base surface, between the first and the second flange, the axial section of the sleeve being limited by a quadrilateral polygon having at least a pair of non parallel opposite sides, a first inner surface of the sleeve resting on the base surface, a second, outer surface of the sleeve providing support to the belt or chain, the sleeve being expandable radially when compressed axially by the flanges along the third and fourth lateral surfaces of the sleeve; and an elastic element exerting an elastic force to move the first flange and the second flange towards each other, thus compressing axially the sleeve and expanding it radially, so that the final external diameter of the sleeve results from a balance between a radial compression of the sleeve between the chain or belt and base surface, and an axial compression exerted on the lateral surfaces of the sleeve by means of the elastic element.

2. The device of claim 1, wherein the sleeve is made of an elastic material which maintains its volume when deformed.

3. The device of claim 1, wherein the sleeve has frustoconical lateral surfaces matching frustoconical flange surfaces of the first sheath part and second sheath parts.

4. The device of claim 1, wherein the sleeve has substantially radial lateral surfaces matching radial flange surfaces of the first sheath part and second sheath part.

5. The device of claim 1, wherein the second sheath part is in the form of a cup mounted with the ability to move in axial translation on the first sheath part.

6. The device of claim 1, wherein the elastic element comprises a spring positioned between the second part and a bearing surface secured to the first part.

7. The device of claim 1, wherein the expandable sleeve is in one piece.

8. The device according to claim 1, wherein the sleeve has a frustoconical inner surface matching the shape of the base surface.

* * * * *